United States Patent
Wang et al.

(10) Patent No.: US 10,822,926 B2
(45) Date of Patent: Nov. 3, 2020

(54) MITIGATING CORROSION OF CARBON STEEL TUBING AND SURFACE SCALING DEPOSITION IN OILFIELD APPLICATIONS

(71) Applicant: Saudi Arabian Oil Company, Dhahran (SA)

(72) Inventors: Qiwei Wang, Dhahran (SA); Tao Chen, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 300 days.

(21) Appl. No.: 15/934,645

(22) Filed: Mar. 23, 2018

(65) Prior Publication Data
US 2018/0274339 A1   Sep. 27, 2018

Related U.S. Application Data

(60) Provisional application No. 62/476,163, filed on Mar. 24, 2017.

(51) Int. Cl.
| | |
|---|---|
| *E21B 41/02* | (2006.01) |
| *F16L 58/04* | (2006.01) |
| *C23F 15/00* | (2006.01) |
| *E21B 37/06* | (2006.01) |
| *C09K 8/54* | (2006.01) |
| *E21B 43/40* | (2006.01) |
| *C09K 8/528* | (2006.01) |
| *E21B 17/02* | (2006.01) |
| *E21B 17/08* | (2006.01) |

(52) U.S. Cl.
CPC ............ *E21B 41/02* (2013.01); *C09K 8/528* (2013.01); *C09K 8/54* (2013.01); *C23F 15/00* (2013.01); *E21B 17/02* (2013.01); *E21B 17/08* (2013.01); *E21B 37/06* (2013.01); *E21B 43/40* (2013.01); *F16L 58/04* (2013.01)

(58) Field of Classification Search
CPC .......... E21B 17/02; E21B 17/08; E21B 41/02
See application file for complete search history.

(56) References Cited

U.S. PATENT DOCUMENTS

| | | | |
|---|---|---|---|
| 2,357,559 | A | 9/1944 | Smith |
| 2,818,383 | A | 12/1957 | Jolly |

(Continued)

FOREIGN PATENT DOCUMENTS

| | | |
|---|---|---|
| CA | 1187064 | 5/1985 |
| CA | 2546164 | 3/2007 |

(Continued)

OTHER PUBLICATIONS

Gulf Cooperation Council Examination Report issued in GCC Patent Application No. GC 2018-35016 dated Oct. 27, 2019, 3 pages.

(Continued)

*Primary Examiner* — Tara Schimpf
(74) *Attorney, Agent, or Firm* — Fish & Richardson P.C.

(57) ABSTRACT

Mitigating corrosion and surface scale formation in a sour gas well includes providing an oil-based liquid to a sour gas well having carbon steel tubing with iron sulfide on a surface of the carbon steel tubing, contacting the carbon steel tubing with the oil-based liquid, and adsorbing a first portion of the oil-based liquid onto the iron sulfide, thereby yielding a hydrophobic coating on the carbon steel tubing.

20 Claims, 3 Drawing Sheets

(56) References Cited

U.S. PATENT DOCUMENTS

| | | |
|---|---|---|
| 2,844,497 A | 7/1958 | Henricks |
| 3,462,239 A | 8/1969 | Swanson et al. |
| 3,629,104 A | 12/1971 | Maddox |
| 3,959,170 A | 5/1976 | Mago et al. |
| 4,057,108 A | 11/1977 | Broussard |
| 4,100,099 A | 7/1978 | Asperger et al. |
| 4,100,100 A | 7/1978 | Clouse et al. |
| 4,351,673 A | 9/1982 | Lawson |
| 4,372,873 A | 2/1983 | Nieh |
| 4,416,333 A * | 11/1983 | Mundhenk .............. C23F 11/00 166/267 |
| 4,988,389 A | 1/1991 | Adamache et al. |
| 5,158,693 A | 10/1992 | Ramanarayan et al. |
| 5,556,575 A | 9/1996 | Babaian-Kibala et al. |
| 6,926,836 B2 | 8/2005 | Fidoe et al. |
| 6,986,358 B2 | 1/2006 | Mattox et al. |
| 7,855,171 B2 | 12/2010 | Trahan |
| 8,673,834 B2 | 3/2014 | Trahan |
| 2005/0263739 A1 | 12/2005 | Mattox et al. |
| 2006/0029808 A1 | 2/2006 | Zhai et al. |
| 2008/0236842 A1 | 10/2008 | Bhavsar et al. |
| 2013/0284518 A1* | 10/2013 | Wu ....................... C09K 8/035 175/65 |
| 2014/0011013 A1 | 1/2014 | Jin et al. |
| 2015/0240627 A1* | 8/2015 | Gao ...................... E21B 47/122 422/82.02 |

FOREIGN PATENT DOCUMENTS

| | | |
|---|---|---|
| EP | 662504 | 7/1995 |
| EP | 1663879 | 6/2006 |
| EP | 2836524 | 2/2015 |
| WO | 2013152832 | 10/2013 |
| WO | 2015042488 | 3/2015 |

OTHER PUBLICATIONS

P.F. Timmins, "Predictive Corrosion and Failure Control in Process Operations: As Applied to the Refining, Petrochemical, and Process Industries," ASM International , Dec. 1996, 23 pages.

Al-Tammar et al., "Saudi Aramco Downhole Corrosion/Scaling Operational Experience and Challenges in HP/HT Gas Condensate Producers," Saudi Aramco Journal of Technology, May 2014, 13 pages.

International Search Report and Written Opinion issued in International Application No. PCT/US2018/023983 dated Jun. 25, 2018, 16 pages.

GCC Examination Report in GCC Appln. No. GC-2018-35016, dated Feb. 24, 2020, 3 pages.

* cited by examiner

MITIGATING CORROSION OF CARBON STEEL TUBING AND SURFACE SCALING DEPOSITION IN OILFIELD APPLICATIONS

CROSS REFERENCE TO RELATED APPLICATION

This patent claims the benefit of U.S. Provisional Application No. 62/476,163, filed Mar. 24, 2017, the entire contents of which is hereby expressly incorporated by reference herein in its entirety.

TECHNICAL FIELD

This document relates to methods for mitigating corrosion of carbon steel tubing and surface scaling deposition on carbon steel tubing in oilfield applications, particularly in sour gas wells.

BACKGROUND

Carbon steel tubing has been widely used as well completion material in sour gas wells in oilfield applications. Despite the cost effectiveness of this tubing, however, the failure of carbon steel tubing due to corrosion and surface scaling deposition downhole are two persistent issues in sour gas wells. This failure can lead to leaking, restriction of downhole surveillance and intervention, significant losses of gas production, and costly damage. While continuous injection of chemicals such as corrosion and scale inhibitors has been used to reduce corrosion and scaling in carbon steel tubing, chemical treatment is not always effective in sour gas wells given the elevated temperatures and high concentration of hydrogen sulfide. In addition, formation damage may result if the injected chemicals flow into the formation.

SUMMARY

In a first general aspect, mitigating corrosion and surface scale formation in a sour gas well includes providing an oil-based liquid to a sour gas well having carbon steel tubing with iron sulfide on a surface of the carbon steel tubing, contacting the carbon steel tubing with the oil-based liquid, and adsorbing a first portion of the oil-based liquid onto the iron sulfide. Adsorbing the first portion of the oil-based liquid onto the iron sulfide yields a hydrophobic coating on the carbon steel tubing.

Implementations of the first general aspect may include one or more of the following features.

The iron sulfide is typically in direct contact with the surface of the carbon steel tubing. The oil-based liquid may include at least one of diesel fuel, kerosene, black oil, or condensate. The hydrophobic coating prevents or inhibits formation of hydrogen sulfide on the carbon steel tubing, prevents or inhibits corrosion of the carbon steel tubing, or both. The hydrophobic coating typically prevents or inhibits direct contact of the water with the carbon steel tubing.

Some implementations of the first general aspect include producing gas from the sour gas well to yield a production stream and separating the oil-based liquid from the production stream before providing the oil-based liquid to the sour gas well. In one embodiment, separating the oil-based liquid from the production stream includes separating condensate from the production stream.

Providing the oil-based liquid to the sour gas well may include injecting the oil-based liquid between a casing of the sour gas well and the carbon steel tubing. Some implementations of the first general aspect include removing a second portion of the oil-based liquid from the sour gas well, reintroducing the second portion of the oil-based liquid to the sour gas well, or both. Certain implementations of the first general aspect include producing gas from the sour gas well to yield a production stream comprising water, with the hydrophobic coating on the carbon steel tubing preventing or inhibiting direct contact of the water with the carbon steel tubing.

In a second general aspect, mitigating surface scale formation and corrosion in a sour gas well includes producing gas from the sour gas well having carbon steel tubing to yield a production stream, separating condensate from the production stream, providing the condensate to the sour gas well, and coating the carbon steel tubing with a first portion of the condensate.

Implementations of the second general aspect may include one or more of the following features.

Providing the condensate to the sour gas well may include injecting the condensate between a casing of the sour gas well and the carbon steel tubing. Coating the carbon steel tubing with the first portion of the condensate typically yields a hydrophobic coating on the carbon steel tubing. The hydrophobic coating prevents or inhibits formation of hydrogen sulfide on the carbon steel tubing, prevents or inhibits corrosion of the carbon steel tubing, or both. The hydrophobic coating typically prevents or inhibits direct contact of the water with the carbon steel tubing.

In some embodiments, the carbon steel tubing has iron sulfide on a surface of the carbon steel tubing, and coating the carbon steel tubing with the first portion of the condensate includes adsorbing the first portion of the condensate onto the iron sulfide.

Some implementations of the second general aspect include removing a second portion of the condensate from the sour gas well, reintroducing the second portion of the condensate to the sour gas well, or both.

Embodiments described herein advantageously inhibit or prevent tubing corrosion and formation of surface scale in sour gas wells. In addition, formation damage via chemical treatment is avoided, and other environmental concerns are mitigated when the injected condensate or oil-based liquids are recycled and reused. Moreover, operation costs are reduced by reducing the corrosivity of carbon steel and reducing the frequency of treatment for scale removal, and capital expenditures are reduced by increasing the durability of the carbon steel.

DETAILED DESCRIPTION

Figure 1:
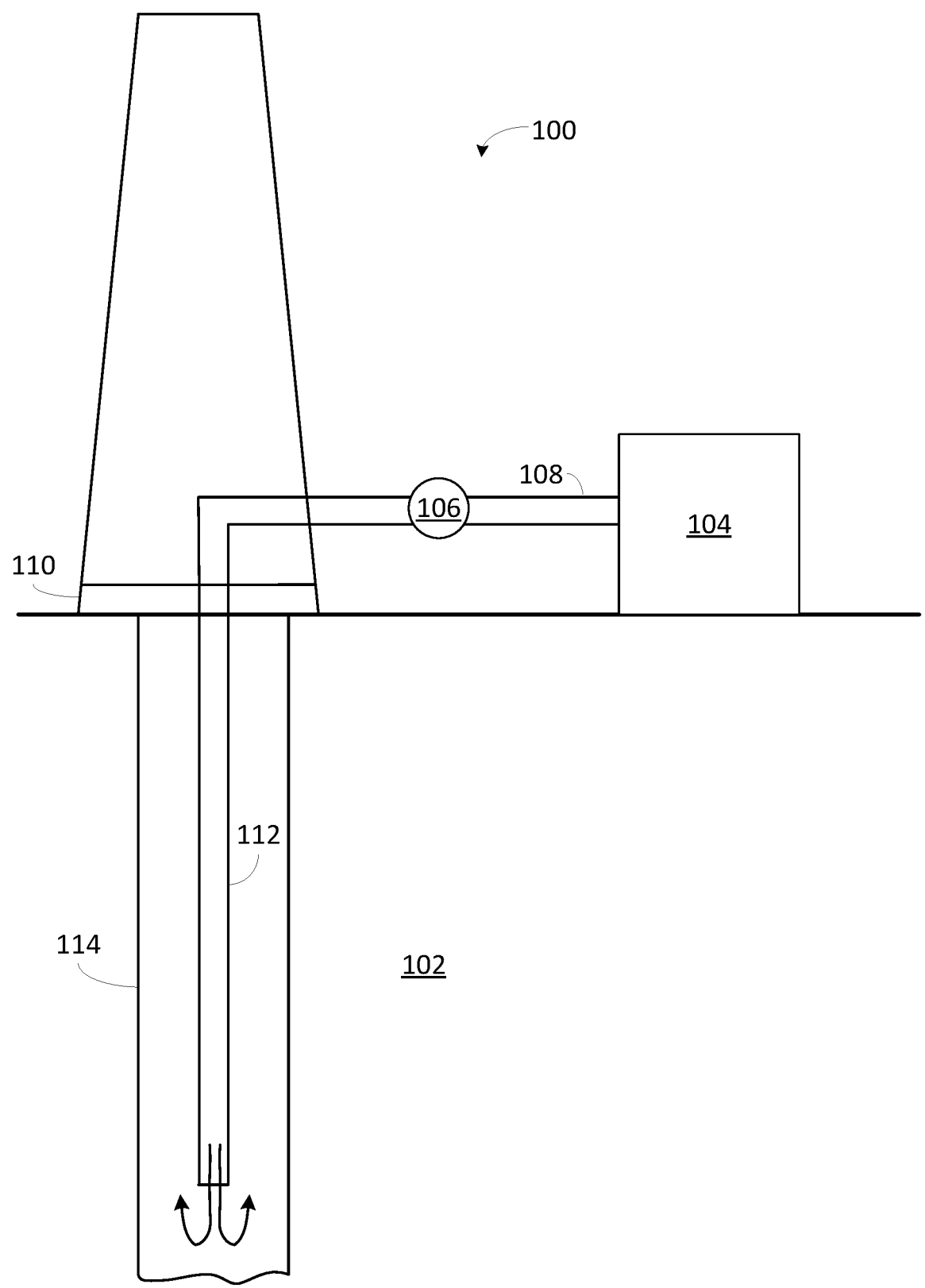
FIG. 1 depicts an exemplary system for providing an oil-based liquid to a sour gas well.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Corrosion and surface scale formation in a sour gas well can be mitigated by reducing the contact of water with carbon steel tubing in the sour gas well. The surface scale typically includes iron sulfide. In some examples, the iron sulfide is in the form of pyrrhotite, triolite, mackinawite, pyrite, marcasite, or greigite. "Sour gas well" refers to a well that produces natural gas or any other gas containing a significant amount of hydrogen sulfide. In one example, natural gas is considered to be sour if the gas contains greater than 5.7 mg of hydrogen sulfide per cubic meter of natural gas, or greater than 4 ppm by volume under standard temperature and pressure. In another example, natural gas is considered to be sour if the gas contains greater than 24 ppm by volume or 100 ppm by volume of hydrogen sulfide. In yet another example, a few parts per million of iron sulfide by weight, such as 5 ppm, promotes iron sulfide deposition.

Reducing the contact of water with carbon steel tubing in a sour gas well can be achieved by coating the carbon steel tubing with a hydrophobic material, thereby establishing a barrier that prevents or inhibits contact of the carbon steel tubing with water produced from the sour gas well. The hydrophobic material may be on oil-based liquid, such as diesel fuel, kerosene, or black oil. In some embodiments, the oil-based liquid is condensate produced from the sour gas well and injected back into the well. Coating the carbon steel tubing with an oil-based liquid can be achieved in situ by contacting the carbon steel tubing with the oil-based liquid, such that the oil-based liquid adsorbs onto iron sulfide on the surface of the carbon steel tubing. The iron sulfide may be in the form of a continuous layer or film on the carbon steel tubing, such that the adsorbed oil-based liquid forms a continuous film or layer on the carbon steel tubing. In some embodiments, the iron sulfide is in the form of a continuous layer or film directly on the carbon steel tubing. The continuous layer of the oil-based liquid forms a barrier between the carbon steel tubing and water flowing through the tubing. Thus, rather than removing iron sulfide on the carbon steel tubing, the iron sulfide promotes adherence of the oil-based liquid to the carbon steel tubing.

Using an oil-based liquid to mitigate corrosion and surface scale formation in sour gas wells reduces the risk of formation damage compared to chemical descaling treatments, such as injection of hydrochloric acid. Using an oil-based liquid to mitigate corrosion and surface scale formation in sour gas wells also extends the lifetime of the carbon steel tubing by avoiding the introduction of corrosive chemicals and reducing the need for chemical descaling treatments of the carbon steel tubing. In addition, because the oil-based liquid can be recycled and reused, environmental concerns regarding the flow of corrosive chemicals into the formation are avoided.

FIG. 1 depicts exemplary system 100 for providing an oil-based liquid to a sour gas well in subterranean formation 102. Oil-based liquid from source 104 is pumped via pump 106 through line 108 to wellhead 110, and enters carbon steel tubing 112. Carbon steel tubing 112 is typically production steel tubing. As indicated by the arrows, oil-based liquid that does not adhere to iron sulfide on an interior surface of carbon steel tubing may circulate back up wellbore 114 through the annular path between the wellbore and carbon steel tubing 112. This recycled oil-based liquid may be reintroduced into carbon steel tubing 112.

Figure 2:
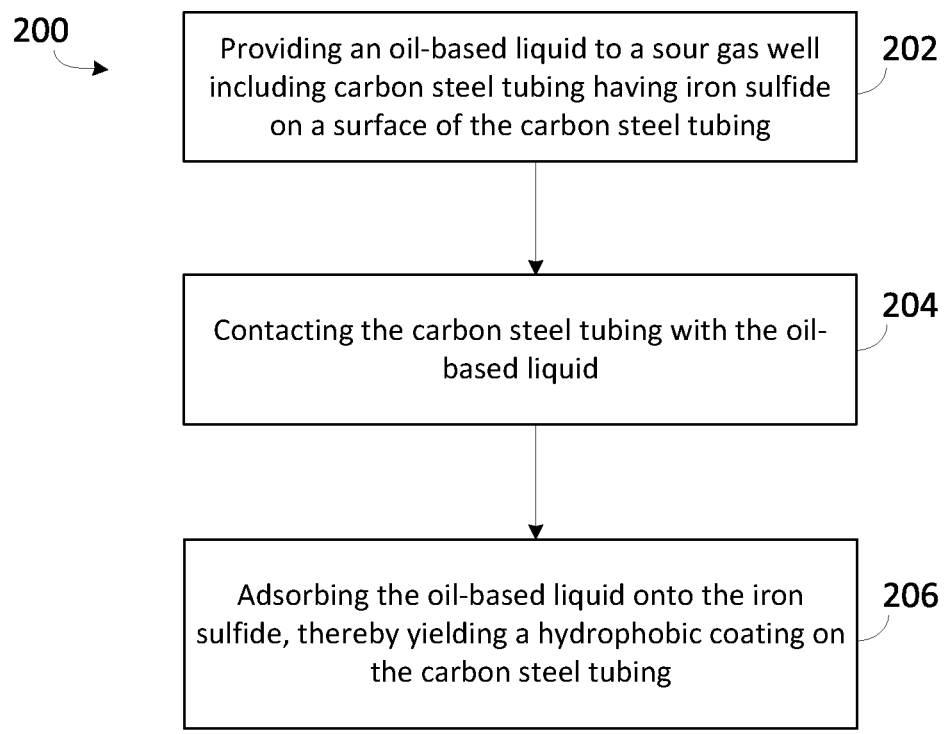
FIG. 2 is a flowchart showing operations in a first exemplary process for mitigating surface scale formation and corrosion in a sour gas well.

FIG. 2 is a flowchart showing operations in process 200 for mitigating surface scale formation and corrosion in a sour gas well. In 202, an oil-based liquid is provided to a sour gas well. The sour gas well includes carbon steel tubing, and the carbon steel tubing has iron sulfide on a surface of the carbon steel tubing. In one example, the iron sulfide is on an interior surface of the carbon steel tubing. The iron sulfide may be in the form of a film or a layer on the carbon steel tubing. The film or layer of iron sulfide may be in direct contact with the carbon steel tubing. In one embodiment, the iron sulfide forms a continuous film or layer on the carbon steel tubing. In 204, the carbon steel tubing is contacted with the oil-based liquid. In 206, a portion of the oil-based liquid is adsorbed onto the iron sulfide, thereby yielding a hydrophobic coating on the carbon steel tubing.

In some embodiments, the oil-based liquid includes at least one of diesel fuel, kerosene, black oil, or condensate. "Condensate" generally refers to a liquid condensed from a gas stream that includes butane, pentane, and heavier hydrocarbon fractions. In some embodiments, gas is produced from the sour gas well to yield a production stream, and the oil-based liquid is separated from the production stream. The oil-based liquid separated from the production stream may then be provided to the sour gas well. In one embodiment, condensate separated from the production stream may be provided to the sour gas well.

In some embodiments, providing the oil-based liquid to the sour gas well comprises injecting the oil-based liquid between a casing of the sour gas well and the carbon steel tubing. In some embodiments, oil-based liquid provided to the sour gas well that did not adhere to the carbon steel tubing is recycled and reintroduced back into the sour gas well.

In some embodiments, gas is produced from the sour gas well to yield a production stream that includes water, and the hydrophobic coating on the carbon steel tubing prevents direct contact of the water with the carbon steel tubing. The hydrophobic coating prevents formation of hydrogen sulfide on the carbon steel tubing and inhibits corrosion of the carbon steel tubing.

Figure 3:
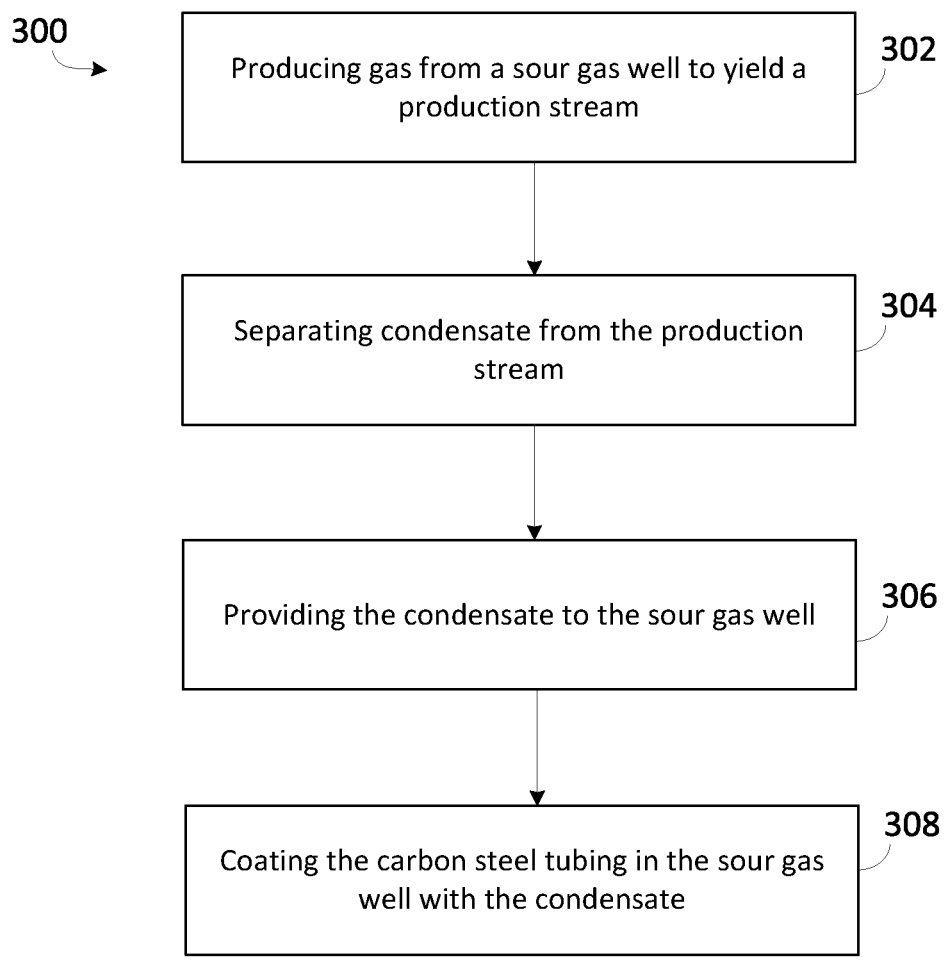
FIG. 3 is a flowchart showing operations in a second exemplary process for mitigating surface scale formation and corrosion in a sour gas well.

FIG. 3 is a flowchart showing operations in process 300 for mitigating surface scale formation and corrosion in a sour gas well having carbon steel tubing. In 302, gas is produced from the sour gas well to yield a production stream. In 304, the condensate is separated from the production stream. In 306, the condensate is provided to the sour gas well. In 308, the carbon steel tubing is coated with the condensate.

In some embodiments, providing the condensate to the sour gas well includes injecting the condensate between a casing of the sour gas well and the carbon steel tubing. The carbon steel tubing may have iron sulfide in the form of a film or layer on a surface of the carbon steel tubing, such that coating the carbon steel tubing with the condensate comprises adsorbing the condensate onto the iron sulfide.

Coating the carbon steel tubing with the condensate yields a hydrophobic coating on the carbon steel tubing. The hydrophobic coating prevents or inhibits formation of hydrogen sulfide on the carbon steel tubing and inhibits corrosion of the carbon steel tubing. The hydrophobic coating also prevents direct contact of water in the carbon steel tubing with the carbon steel tubing.

Condensate that does not form a coating on the carbon steel tubing may be removed from the sour gas well and recycled.

Definitions

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise. The term "about" can allow for a degree of variability in a value or range, for example, within 10%, within 5%, or within 1% of a stated value or of a stated limit of a range.

The term "fluid" refers to gases, liquids, gels, slurries with a high solids content, and critical and supercritical materials.

The term "subterranean formation" refers to any material under the surface of the earth, including under the surface of the bottom of the ocean. For example, a subterranean formation can be any section of a wellbore and any section of a subterranean petroleum- or water-producing formation or region in fluid contact with the wellbore. In some examples, a subterranean formation can be any below-ground region that can produce liquid or gaseous petroleum materials, water, or any section below-ground in fluid contact therewith. For example, a subterranean formation can be at least one of an area desired to be fractured, a fracture, or an area surrounding a fracture, and a flow pathway or an area surrounding a flow pathway, where a fracture or a flow pathway can be optionally fluidly connected to a subterranean petroleum- or water-producing region, directly or through one or more fractures or flow pathways.

OTHER EMBODIMENTS

It is to be understood that while embodiments have been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of mitigating corrosion and surface scale formation in a sour gas well, the method comprising:
   separating condensate from a production stream of a sour gas well;
   providing the condensate to the sour gas well comprising carbon steel tubing, wherein the carbon steel tubing comprises iron sulfide on a surface of the carbon steel tubing;
   contacting the carbon steel tubing with the condensate; and
   adsorbing a first portion of the condensate onto the iron sulfide, thereby yielding a hydrophobic coating on the carbon steel tubing.

2. The method of claim 1, wherein the condensate comprises at least one of diesel fuel, kerosene, or black oil.

3. The method of claim 1, wherein the iron sulfide is in direct contact with the surface of the carbon steel tubing.

4. The method of claim 1, comprising:
   producing gas from the sour gas well to yield the production stream; and
   separating the condensate from the production stream before providing the condensate to the sour gas well.

5. The method of claim 1, wherein the method does not comprise continuous injection of a corrosion inhibitor into the sour gas well in addition to providing the condensate to the sour gas well.

6. The method of claim 1, wherein providing the condensate to the sour gas well comprises injecting the condensate between a casing of the sour gas well and the carbon steel tubing.

7. The method of claim 1, comprising removing a second portion of the condensate from the sour gas well after providing the condensate to the sour gas well.

8. The method of claim 7, comprising reintroducing the second portion of the oil-based liquid to the sour gas well.

9. The method of claim 1, comprising producing gas from the sour gas well to yield the production stream comprising water, wherein the hydrophobic coating on the carbon steel tubing prevents direct contact of the water with the carbon steel tubing.

10. The method of claim 1, wherein the hydrophobic coating inhibits or prevents formation of hydrogen sulfide on the carbon steel tubing.

11. The method of claim 1, wherein the hydrophobic coating inhibits or prevents corrosion of the carbon steel tubing.

12. A method of mitigating surface scale formation and corrosion in a sour gas well, the method comprising:
   producing gas from the sour gas well to yield a production stream, wherein the sour gas well comprises carbon steel tubing comprising iron sulfide on a surface of the carbon steel tubing;
   separating condensate from the production stream;
   providing the condensate to the sour gas well; and
   coating the carbon steel tubing with a first portion of the condensate, wherein coating the carbon steel tubing comprises adsorbing the first portion of the condensate onto the iron sulfide.

13. The method of claim 12, wherein providing the condensate to the sour gas well comprises injecting the condensate between a casing of the sour gas well and the carbon steel tubing.

14. The method of claim 12, wherein coating the carbon steel tubing does not comprise coating the carbon steel tubing with chemicals in addition to the condensate.

15. The method of claim 12, wherein coating the carbon steel tubing with the first portion of the condensate yields a hydrophobic coating on the carbon steel tubing.

16. The method of claim 15, wherein the hydrophobic coating prevents or inhibits formation of hydrogen sulfide on the carbon steel tubing.

17. The method of claim 15, wherein the hydrophobic coating prevents or inhibits corrosion of the carbon steel tubing.

18. The method of claim 15, wherein the hydrophobic coating prevents or inhibits direct contact of water with the carbon steel tubing.

19. The method of claim 12, comprising removing a second portion of the condensate from the sour gas well.

20. The method of claim 19, comprising reintroducing the second portion of the condensate to the sour gas well.

* * * * *